United States Patent
Uno et al.

[15] 3,657,982
[45] Apr. 25, 1972

[54] EXPOSURE TIME CONTROLS FOR CAMERAS

[72] Inventors: Naoyuki Uno, Oi-Machi; Koichiro Watanabe, Tokyo, both of Japan

[73] Assignee: Asaki Kogaku Kogyo Kabushiki Kaiska, Tokyo-to, Japan

[22] Filed: June 1, 1970

[21] Appl. No.: 42,386

[30] Foreign Application Priority Data

June 7, 1969 Japan.................................44/44904

[52] U.S. Cl..................................95/53 E, 95/53 EB, 95/57
[51] Int. Cl. .........................................................G03b 9/62
[58] Field of Search ................95/53 E, 53 EB; 335/219, 281

[56] References Cited

UNITED STATES PATENTS

| 3,472,141 | 10/1969 | Hilbig et al.........................335/281 X |
| 3,498,195 | 3/1970 | Ono.....................................95/53 EB |
| 2,271,340 | 1/1942 | Jacobson...............................95/53 E |
| 1,325,048 | 12/1919 | Simon ...................................95/53 E |

FOREIGN PATENTS OR APPLICATIONS

| 1,479,720 | 3/1967 | France ...................................95/53 E |

Primary Examiner—Samuel S. Matthews
Assistant Examiner—Russell E. Adams, Jr.
Attorney—Steinberg & Blake

[57] ABSTRACT

An exposure time control to be used in cameras for determining the extent of exposure time. An electrical structure is provided for determining the exposure time, and this electrical structure includes an electromagnet which initiates the shutter-closing operations, so as to terminate the exposure. The electromagnet has an armature and a core toward which the armature is attracted when the electromagnet is energized. An adjusting means is provided for adjusting the armature with respect to the core in such a way as to achieve an efficient operation of the mechanical components even with respect to extremely short exposure times.

4 Claims, 8 Drawing Figures

INVENTOR
NAOYUKI UNO
BY KOICHIRO WATANABE
Steinberg and Blake
ATTORNEY 3,657,982

EXPOSURE TIME CONTROLS FOR CAMERAS

BACKGROUND OF THE INVENTION

The present invention relates to cameras.

In particular, the present invention relates to structures for determining the exposure time during the operation of a camera.

As is well-known, there are automatic exposure time control structures which will automatically determine the time during which a camera shutter remains open, so as to achieve a proper exposure in accordance with the photographing conditions such as the light intensity of the object which is photographed, the speed of the film, and the aperture setting. Thus, in order to achieve such automatic exposure time determination, there are known control assemblies which consist of an electrical section and a mechanical section. The electrical section determines the required duration for the exposure time in accordance with conditions as referred to above. The mechanical section brings about the actual movement of the components so as to maintain the shutter open only for a period of time in accordance with the signal which is transmitted to the mechanical from the electrical section.

The time-determination function of the electrical circuit section has been improved so that it can handle a relatively great range of illumination at the object, as a result of improvements in those components which detect the illumination at the object. Also, the time value which is required for a particular exposure is determined in an extremely short, practically instantaneous, time by the computing portion of the electrical circuit section.

On the other hand, the mechanical movements which the components of the mechanical section must be carried out are still limited. The progress in the development of this section has not matched that of the electrical section. As a result, while it is indeed possible for the electrical section to function perfectly in connection with high-speed exposure time controls, involving extremely short exposure times, the mechanical structure is incapable of carrying out in an accurate, efficient manner the movements necessary to carry into actual practice the extremely short exposure times which are available from the electrical section.

SUMMARY OF THE INVENTION

It is accordingly a primary object of the present invention to provide a construction which will avoid the above drawbacks.

In particular, it is an object of the invention to provide for a camera a structure which will enable the camera to effectively carry out at its mechanical section extremely short exposure times matching those which can be achieved with the electrical section.

Thus, it is a primary object of the present invention to provide a camera with a construction which will enable it to perform accurately exposure time controls in a high-speed range, thus effectively achieving exposures of extremely short duration.

According to the invention the camera includes an electrical structure for initiating the shutter-closing operations, and this electrical structure includes an electromagnet having a core and armature. The armature is held next to the energized core during the time when the shutter is open, and a train of mechanically driven elements coact with the armature to displace it away from the core of the electromagnet when initiating the shutter-closing operations. According to the invention, a fine adjusting means is provided for very accurately adjusting the armature with respect to the core so as to bring about in this way a substantial reduction in any play, gaps, or lost motion of any type in the transmission of movement between the train of mechanical components which bring about shutter closing, so that in this way it becomes possible for the mechanical section to function also effectively when performing exposures of extremely short duration.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
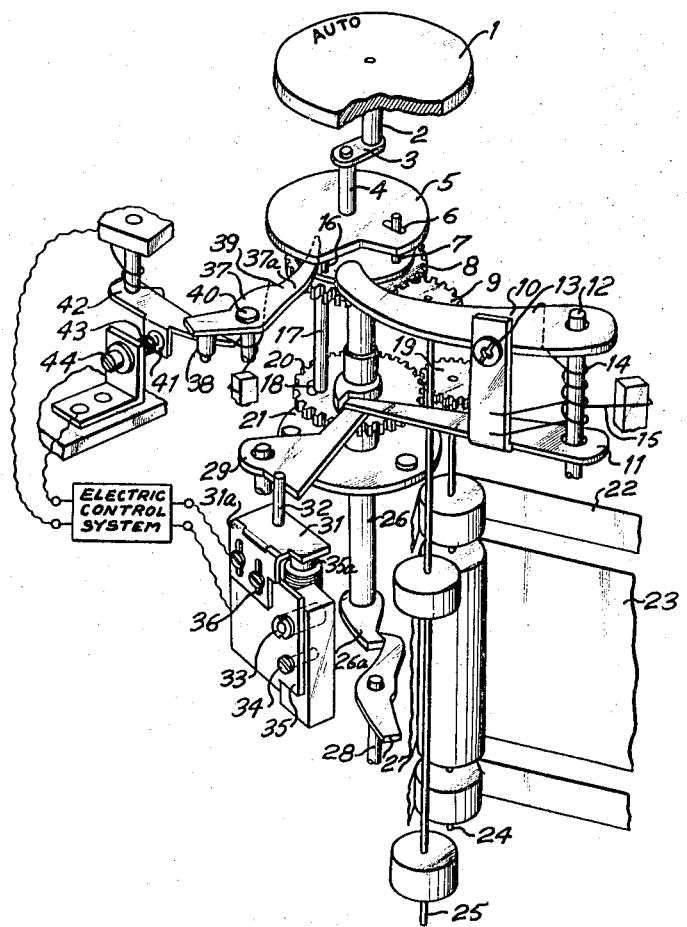
FIG. 1 is a fragmentary perspective diagrammatic illustration of the control structure of the invention as incorporated into a camera having a focal plane shutter.

Referring to FIG. 1, the parts are illustrated therein in the position they take after the shutter has been cocked in preparation for making an exposure. The particular shutter mechanism disclosed is a focal plane shutter of well-known construction used with a single lens reflex camera which is provided with the structure of the invention. The illustrated structure includes components for setting the exposure time either manually at a value selected by the operator or for determining the exposure time automatically. The automatic determination of the exposure time takes place with an electrical structure which automatically determines the exposure in accordance with such factors as the brightness of the light of the object, the film speed, and the aperture setting, through the computing operations which are carried out by the electrical circuit.

At the upper part of FIG. 1 there is shown a shutter-controlling dial 1 accessible to the operator and having a scale to be matched against an index for determining the angular position of the shutter-setting dial 1. As is shown in FIG. 1, one of the settings on the dial 1 is "auto" which indicates that part of the dial which should be placed in register with a stationary index when the camera is to be set for automatic determination of exposure time. Other unillustrated graduations of exposure time are provided for selective registry with the index when exposure time is to be mechanically determined through manual selection.

The dial 1 is accessible, for example, at the top wall of the camera, and a rotary shaft 2 extends through a suitable bearing, for example, through the top wall of the camera into the interior thereof where the bottom end of the rotary shaft 2 is fixed to a transversely extending lever 3. At the outer end of the lever 3 is a second shaft 4 which is parallel to the shaft 2 and which is freely rotatable with respect to the lever 3 on which the shaft 4 is mounted. A cam plate 5 is fixed with the shaft 4 so as to rotate therewith, and this cam plate 5 is formed with a substantially radial slot 6 through which a pin 7 extends. The pin 7 is fixed to a rotary gear 8 which meshes with a gear 9 which in turn is connected to the rotary shaft 25 of the leading curtain 22 of the focal plane shutter. Thus, when the shutter is released to make an exposure, the movement of the leading curtain 22, to open the shutter, will bring about rotary movement of the shaft 25 and through the gear 9 rotation of the gear 8 so that the pin 7 will transmit this rotary movement through the slot 6 to the cam plate 5.

A stationary shaft 12 supports for swinging movement a pair of levers 10 and 11. These levers are urged in opposite directions about the shaft 12 by a spring 14 while a screw 13 carried by a lug extending from the lever 11 engages an edge of the lever 10 so that with this arrangement the angular position between the levers 10 and 11 can be adjusted. An additional spring 15 is provided for urging the entire assembly of levers 10 and 11 in a clockwise direction about the pin 12, as viewed in FIG. 1.

A pin 16 is fixed to and extends upwardly from the gear 8 while a pin 17 is fixed to and extends downwardly from the gear 8. The lower end of the pin 17 is positioned in the path of movement of the pin 18 which is fixed to a gear 20. The gear 20 meshes with a gear 19 fixed to the shaft 24 which is rotated by the trailing curtain 23 of the focal plane shutter when this trailing curtain follows the leading curtain in order to terminate the exposure by closing the shutter. Thus, when elements referred to below are actuated to bring about closing of the shutter, the shaft 24 will be driven by the trailing curtain 23 for rotating the gears 19 and 20. Because the pin 17 is in the path of movement of the pin 18 it is not possible for the trailing curtain 23 to be driven to its closed position. The gear 20 tends to rotate in a counterclockwise direction, as viewed in FIG. 1, and it is this rotation which is prevented by engagement by the pin 18 with the pin 17.

An actuating tooth 21 is fixed to the upper surface of the gear 20 and is positioned so as to engage either the lever 11 or a lever 29, so that the latter levers also prevent the gear 20 from rotating in a counterclockwise direction, as viewed in FIG. 1, by coaction with the tooth 21. The gear 20 is supported for free rotary movement about an elongated shaft 26 which at its bottom end carries a tooth 26a. This tooth 26a engages an actuating lever 27 mounted on a shaft 28. The gear 8 is fixed to the shaft 26, and the lever 27 coacts with the tooth 26a so as to maintain the shutter in its cocked position.

The electrical structure for controlling the operation of the shutter includes an electromagnet 35. The operation of this electromagnet is controlled by the electrical system. The electromagnet is provided with a core 35a and with an armature 31. This armature is hinged along one side edge region 31a to a stationary part of the assembly. The armature 31 in the illustrated embodiment fixedly carries a pin 32 which is situated next to an edge of the lever 29 which is supported for swinging movement about a stationary pin shown at the left end of the lever 29 in FIG. 1. An adjusting plate 36 supports at its upper edge the armature 31 for swinging movement at the hinge 31a, and this plate 36 is formed with vertical slots through which screws extend so that the elevation of the plate 36 may be adjusted in order to adjust the position of the armature 31 relative to the core 35a.

Situated in the path of movement of the pin 16, which is fixed to the gear 8, is a lever 37 which at one end extends across the path of movement of the pin 16 and at its other end carries an electrically insulated actuating pin 38. This lever 37 is supported for turning movement intermediate its ends on a shaft 40, and a spring 39 urges the lever 37 in a clockwise direction, as viewed in FIG. 1. The pin 38 is arranged to actuate a starting switch 42 which initiates the operation of the electrical control system. This starting switch 42 is made up of a pair of contacts 41 and 43 which may have the spacing therebetween adjusted by a screw 44. FIG. 1 illustrates schematically the electrical connection between the switch structure 42 for initiating the shutter operation and the electromagnet 35, this electrical structure forming the electrical control system which will automatically determine in a known way the exposure time according to such factors as film speed, object brightness, and aperture setting.

In order to bring about operation of the electrical control system, the dial is set with the graduation "AUTO" in registration with the stationary index, as was pointed out above. The result is that the cam plate 5 and the lever 10 coact to situate the lever 11 in the position where it is displaced from its operating position where it coacts with the tooth 21, in order to release the trailing curtain for movement to its closed position, or the components will in this way be positioned so that the lever 11 is in the condition where it will withdraw from any location where it can possibly coact with the tooth 21 at a very early moment during the release operation referred to below.

In order to make an exposure, the operator will depress a plunger or the like so as to bring about disengagement of the shutter-releasing lever 27 from the tooth 26a. Thus, the shaft 26 is released for rotary movement by the spring which urges the lading curtain 22 to its open position. The gear 9 rotates the gear 8 and the shutter assumes an open position. At this time, the electrical control system is, course, operating, and it functions so that at this time current is supplied to the electromagnet 35. As a result, the core 35a is energized and the armature 31 is attracted to and maintains an engagement with the energized core. The pin 32, therefore, prevents the lever 29 from being swung in a clockwise direction by the tooth 21, as viewed in FIG. 1. Therefore, the gear 20, which is in driving engagement with the shaft 24 of the trailing screen, is prevented from rotating. After a lapse of time from the moment of shutter release, determined by the electrical structure, the current supply to the electromagnet 35 is terminated, so that the armature 31 can be swung away from the core 35a and the tooth 21 can now turn the lever 29 so that the trailing screen 23 is released for movement to its closed position. A spring which is not illustrated in FIG. 1 urges the armature 31 back toward the core 35a.

Figure 2:
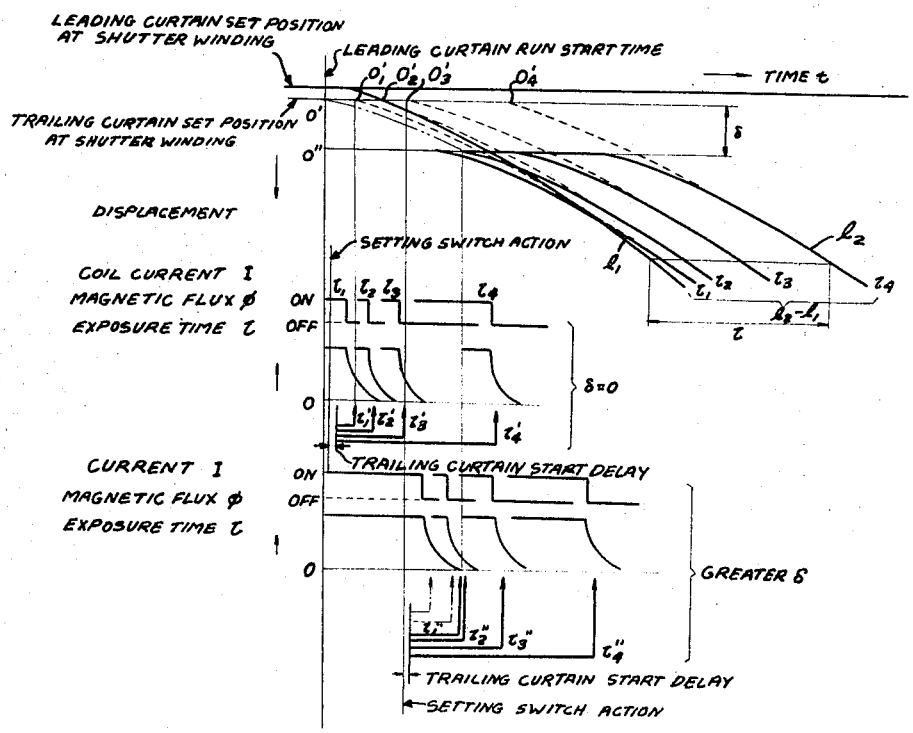
FIG. 2 is a graph illustrating various operating characteristics of the shutter control assembly shown in FIG. 1.

Referring to FIG. 2, the graph illustrated therein shows exposure time setting with respect to lapse of time, shutter curtain displacement, coil current I of the electromagnet, and magnet flux $\phi$ of the electromagnet. The graph illustrates the starting point zero for the run of the leading curtain from its initial cocked position through the position opening the shutter. The adjusted or preselected starting point $O'$ for the trailing screen is illustrated with an adjusted gap $\delta$. This $\delta$ results from errors and unavoidable inaccuracies during machining and assembling of the train of driving elements which transmit motion to the armature 31, and in particular, the train of driving elements between the tooth 21 and the armature 31. Because of the maladjustment, the trailing screen starting point is actually $O''$. The graph also illustrates the leading curtain displacement curve $1_1$ and the trailing screen displacement curve $1_2$. The horizontal distance between the curves $1_1$ and $1_2$ along the time axis or abscissa $t$ corresponds to the exposure time $\tau$. With a suitably selected origin or starting point, the trailing screen starts to run from its cocked position to its shutter-closing position at times $O'_1, O'_2, O'_3 \cdots$, coinciding with the set values $\tau_1, \tau_2, \ldots$ of the exposure time $\tau$ respectively.

Thus, it is possible to electrically determine and control the exposure time in an automatic manner. Immediately after the leading curtain starts its run to the shutter-opening position, the contacts 41 and 43 of the initiating switch 42 are opened, and the electrical control system starts to operate. After a lapse of time $\tau_1, \tau_2 \ldots$, the supply of coil current I is terminated. Then, the magnetic flux $\Phi$ gradually decreases as illustrated in the graph of FIG. 2. When the magnetic flux $\Phi$ reaches a given value, the armature 31 is swung away from the core 35a due to the force of the spring which acts on the trailing curtain and transmits the motion to the armature from the tooth 21 and the lever 29. Thus, the trailing curtain runs from its cocked to the shutter-closing position.

Referring now to the starting point $O''$ of FIG. 2, after there has been a lapse of predetermined time intervals $\tau_1, \tau_2, \ldots$, the electrical control system is switched off, $\tau''_3$ and $\tau''_4$ are set, but with respect to $\tau''_1$ and $\tau''$, at the time indicated by dot-dash line exposure time in FIG. 2. The force exerted by any residual magnetic flux $\Phi$ should be overcome by the spring force and mechanical transmission to the armature 31, as pointed out above. However, in the case where the gap or, in other words, inaccuracies, play, and the like, between the motion-transmitting components, designated by δ, is relatively great, as shown at the lower portion of FIG. 2, the trailing curtain runs as shown by the dot-dash line of displacement since it has left the point $O'$ but has not yet reached the point $O''$. When the trailing screen reaches the point $O''$, it brings about the pushing of the armature 31 of the electromagnet 35 so as to swing the armature away from the core, and the trailing curtain continues to run to the shutter-closing position. If, during this operation, the spring urging the trailing curtain to the shutter-closing position contributes the force for swinging the armature 31 away from the core 35a, then according to the electro-mechanical principles of Maxwell-Lagrange, the force with which the trailing curtain runs and the holding force of magnetic attraction of the electromagnet interfere with and oppose each other, so that the running characteristics become abnormal as compared with the case where the gap δ is relatively small, FIG. 2 illustrating between the upper and lower portions the characteristic curves for a gap δ which is $O$. The exposure time $\tau$ is made up of values such as $\tau''_1, \tau''_2 \ldots$ and $\tau''_3, \tau''_4 \ldots$ and such times can be set, but the relatively short exposure times $\tau''_1$ and $\tau''_2$ cannot actually be effectively carried out.

As a result, it becomes essential with the condition described above in connection with FIGS. 1 and 2, to adjust the gap so as to enable high-speed range exposure time controls such as $\tau_1$ and $\tau_2$ to be effectively carried out. During the initial part of the run of the curtain, or, in other words, of the movement of the members associated with the run of the curtain, the speed of movement is quite small, and components with a small gap or play therebetween require a certain amount of time in order to come into motion-transmitting, close contact with each other. Any machining or assembling error may make it impossible to achieve precise control of exposure time, particularly at extremely small values.

Figure 3:
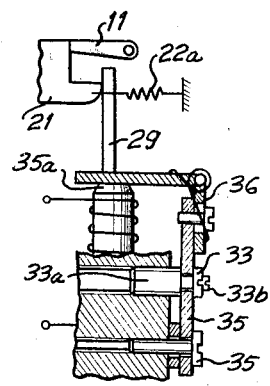
FIG. 3 is a schematic fragmentary partly sectional illustration of an electromagnet and part of the train of elements which displace the armature away from the core thereof, FIG. 3 illustrating one possible embodiment of an adjusting means of the invention as incorporated into this assembly.

In accordance with the present invention, one embodiment of a construction which may be used for adjusting the gap δ is illustrated in FIG. 3. At the lower right portion of FIG. 3 there is shown in section the main supporting plate of the electromagnet 35, this main supporting plate serving to carry the adjusting plate 36 to which the armature is hinged as described above, and it will be noted that FIG. 3 shows the spring which urges the armature toward the core 35a.

The adjusting means of this embodiment includes a screw 33a threaded into the base, in a threaded bore thereof, this base being fragmentarily illustrated schematically just to the left of the plate which carries the adjuster 36. This adjusting screw 33a of the adjusting means is actuated from the exterior through the head 33, and beside this screw is a second adjusting screw 33b which is turned in a threaded opening so as to fix the plate which carries the adjusting element 35 in the position determined by the adjusting screw 33a. Also, there is a lower screw 34 which can be loosened and then tightened after the required adjustments are made. In this way it becomes possible to adjust the entire structure which carries the armature 31 so as to adjust the location of the swing axis of the armature determined by the hinge 31a, and in this way the gap or play in the train of motion-transmitting elements between the tooth 21 and the armature 31. In the schematic representation of FIG. 3, the tooth 21 is shown directly engaging element 29 which for convenience is shown fixed to and projecting from the armature. However, this construction is the equivalent of that of FIG. 1. There is also shown schematically the spring 22a which urges the trailing curtain towards its closed position and acts on the tooth 21 to urge it in the direction which tends to swing the armature away from the core 35a. Also the lever 11 is schematically represented in FIG. 3.

Figures 4, 5:
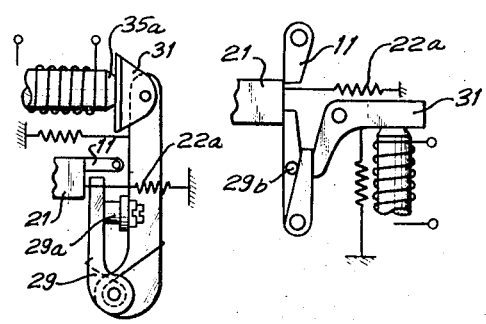
FIG. 4 shows another embodiment of an adjusting means for regulating the transmission of motion to the armature of the electromagnet.
FIG. 5 is a schematic representation of yet another embodiment of a structure of the invention for adjusting the coaction between the components associated with the armature of the electromagnet.

According to the embodiment of the invention which is illustrated in FIG. 4, the element 29 is situated in the path of movement of the tooth 21 which again is urged by the spring 22a in a manner schematically represented. The spring which urges the armature 31 toward the core 35a in this case acts on a lever which swings about the same axis that the lever 29 swings about. Between this lever which pivotally carries the armature 31 and the lever 29 is the adjusting structure 29a in the form of a threaded body which can be turned between the lever 29 and the lever carrying the armature 31 to adjust the angular distance therebetween, the spring shown at the bottom of FIG. 4 urging these levers toward each other so that the distance therebetween can be adjusted by the adjusting structure 29a. Suitable fixing screws are schematically represented for fixing the adjusting assembly 29a in its adjusted position determining the angular position of the levers with respect to each other. In this way, also it is possible to carry out an adjustment of the gap or play in the train of the motion-transmitting components between element 21 and the armature 31.

Yet another embodiment of the adjusting means is illustrated in FIG. 5. As may be seen from FIG. 5, in this case the armature 31 presses against one lever which turns about the same shaft as a second lever engaged by the tooth 21 and carrying a pin 29b. FIG. 5 also illustrates the lever 11 and the spring 22a. By choosing a pin 29b of a predetermined size, it is possible to adjust the angular positions between the pair of levers situated between and engaging the armature 31 and the tooth 21, so that in this way also it is possible to adjust the gap δ. It will be noted that with the embodiment of FIG. 5 the effect is to adjust the angular position of the armature about its turning axis with respect to the core of the armature, while with the embodiments of FIGS. 3 and 4 the armature together with its turning axis are both adjustably moved.

Figure 6:
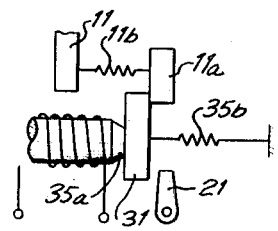
FIG. 6 is a schematic representation of yet another embodiment of a structure for controlling the operation in connection with initiating the shutter-closing operations.

FIG. 6 schematically illustrates an arrangement to be used in an assembly which differs from that of FIG. 1. With the arrangement of FIG. 6, there is a spring 35b which coacts with the armature 31 so as to tend to pull it away from the core 35a when the holding force of the electromagnet 35 becomes small enough. This movement of the armature 31 under the influence of the spring 35b causes the armature to engage and turn the tooth 21, and in this way the trailing curtain is released for movement from its cocked position to the shutter-closing position.

In this embodiment the armature 31 is urged toward the core 35a by movement of the lever 11 to the left, as viewed in FIG. 6. Should this lever 11 move excessively at this time, a force which is greater than required will be produced between the core 35a and the lever 11 so that there is a danger of damage. Therefore, in the actual construction an arrangement is provided for absorbing the excessive force, and this arrangement includes a spring 11b situated between the lever 11 and an armature-actuating component 11a. Upon movement of the lever 11 to the left, as viewed in FIG. 6, the actuating member 11a will press the armature 31 against the core 35a, and any excessive force is absorbed by the spring 11b. Now taking into consideration the time which is required for these components to move, with respect to the characteristics illustrated in the graph of FIG. 2, it is clear that for high-speed range exposure times of extremely short duration the components 11, 11a and 11b must be spaced beyond the armature 31 before the holding force of the electromagnet suddenly changes. For this purpose it is desirable to be able to adjust the gap, as referred to above, as well as the force of the spring acting between the components 11 and 11a.

In a fairly elaborate miniaturized structure such as that of a camera, it is highly desirably that the electromagnet which is used be of a small size. It is well-known that a core of an excessively small cross-section or the existence of a gap or a non-ferromagnetic object between the core and the armature will weaken the holding force between the core and armature considerably. When dealing generally with relatively heavy, large machines, a gap is often provided intentionally in order to protect the core-armature contact surface and eliminate the influence of residual magnetism. In cameras, however, because of the above factors, a close contact between the core and armature is suitable for miniaturizing purposes, and it is unlikely that any damage is caused by close contact between the armature as would be the case in larger machines. Moreover, with respect to the influence of residual magnetism, it is possible to compensate any error in exposure time by adjusting the acting time of the circuit-operating switch.

In structures of this type which have relatively small electromagnets, the contact surface between the core and armature takes the form either of a plane or of part of a sphere, and the contact surface is plated, chemically or mechanically roughened, or polished. Where the contact surface between the core and armature is plane, the holding force is relatively great provided that the entire surface area is in close contact. However, any slight insufficiency or lack of full contact over the entire area considerably weakens the holding force. Where a spherical contact surface is provided, the maximum holding force is indeed smaller than that which can be achieved with plane contact surfaces, but in this case if there is a slight insufficiency in the contact, there is hardly any appreciable influence of any type on the holding force.

Figure 7:
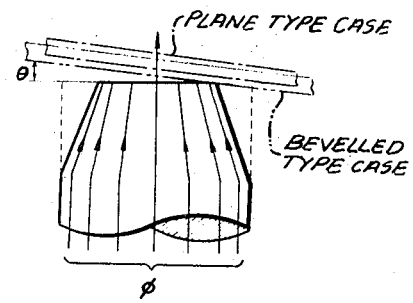
FIG. 7 is a schematic fragmentary enlarged illustration of a special coaction between the core and armature of an electromagnet according to the invention.
Figure 8:
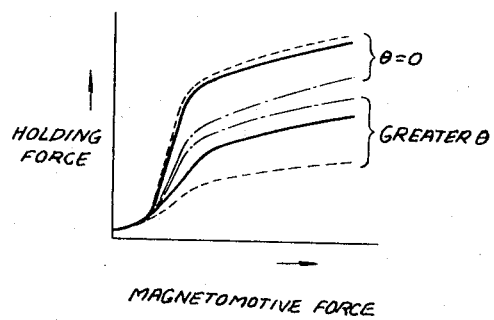
FIG. 8 is a graph illustrating the operating characteristics of the structure of FIG. 7 as compared with known types of electromagnetic structures.

Referring to FIG. 7, with the arrangement of the invention illustrated therein, the core of the electromagnet is shown as having a flat or plane contact surface but the core tapers so as to gradually reduce in cross-section in the region of the plane end face which forms the contact surface. An armature is illustrated inclined with respect to the cone axis and engaging the latter at a given angle $\theta$. A comparison of the holding forces achieved with this tapered core and with the plane-type and spherical-type of contact is illustrated in the graph of FIG. 8. The tapered core characteristic according to the present invention is shown in solid lines with respect to the plane-type characteristic shown in dotted lines and the spherical-type characteristic shown in dot-dash lines. The angle $\theta$ indicates the amount of insufficiency in the contact. As is apparent from FIG. 8, with this insufficiency of an amount $\theta$, the tapered type of core has a characteristic curve positioned between the plane and spherical characteristic curves. Moreover, the tapered core characteristic curve can be established in such a way as to practically achieve almost all of the advantages of the plane and spherical types of contact surfaces. Thus, with a small adjustment, a relatively high holding force can readily be obtained.

As is apparent from FIG. 7, the tapered configuration of the core in the region of its contact surface causes hardly any decrease in the amount of magnetic flux, and with respect to the extent of contact insufficiency, the condition is superior to the plane-type of contact surface. This advantage of the invention is more effectively achieved by forming the small gap portion, which is to say, the core-armature contact portion, into a plane with the tapered configuration illustrated and providing a device for adjusting the armature. Thus, it will be noted that in FIGS. 3-6 the core 35a is indeed shown as having a tapered end terminating in a flat surface to be engaged by the armature and all of these embodiments have the adjusting devices for the armature as described above.

What is claimed is:

1. In a camera, an electrical structure for initiating closing of a camera shutter to determine the exposure time, said electrical structure including an electromagnet having a core, an armature, and a coil surrounding said core, said core having an elongated portion of a given diameter surrounded by said coil and having a tapered end portion terminating in a flat end face and having its maximum diameter next to said elongated portion of said core which is surrounded by said coil and its minimum diameter at said flat face, said maximum diameter of said tapered end portion equalling the diameter of said elongated core portion which is surrounded by said coil, said armature being situated adjacent and coacting with said flat end face of said core, adjusting means operatively connected with said armature for inclining the latter at a selected angle with respect to said flat face, a train of motion-transmitting elements operatively connected with said armature for transmitting motion thereto for displacing the latter away from said flat end face of said core to initiate shutter-closing operations, said adjusting means being operatively connected with said armature for positioning the latter with respect to said flat end face of said core at a location which will achieve high-speed mechanical operation for short exposure times, and a trailing curtain of a focal plane shutter operatively connected to said train of elements for driving the latter when the electrical structure releases said armature for movement away from said flat end face of said core, said train of motion-transmitting elements including one motion-transmitting element coacting with said armature for transmitting its motion thereto, and said armature being supported for swinging movement toward and away from said flat end face of said core, said adjusting means being operatively connected with said armature for adjusting the latter with respect to said one motion-transmitting element.

2. The combination of claim 1, a spring operatively connected to said trailing curtain for urging the latter toward its closed position and operatively connected to said train of elements for driving the latter.

3. The combination of claim 1 and wherein said adjusting means adjusts the location of the axis about which said armature turns.

4. The combination of claim 1 and wherein said adjusting means adjusts the angular position of said armature with respect to the axis about which it turns.

* * * * *